US012173623B2

(12) United States Patent
Burnes et al.

(10) Patent No.: US 12,173,623 B2
(45) Date of Patent: Dec. 24, 2024

(54) PNEUMATICALLY VARIABLE TURBINE NOZZLE

(71) Applicant: Solar Turbines Incorporated, San Diego, CA (US)

(72) Inventors: Daniel W. Burnes, San Diego, CA (US); James W. Mohr, El Cajon, CA (US); Tyson M. Ferguson, Encinitias, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 17/847,600

(22) Filed: Jun. 23, 2022

(65) Prior Publication Data

US 2023/0417146 A1 Dec. 28, 2023

(51) Int. Cl.
*F01D 9/04* (2006.01)
*F01D 17/16* (2006.01)

(52) U.S. Cl.
CPC ........... *F01D 9/041* (2013.01); *F01D 17/162* (2013.01); *F05D 2240/123* (2013.01); (Continued)

(58) Field of Classification Search
CPC .. F01D 9/041; F01D 17/162; F05D 2240/123; F05D 2240/124; F05D 2240/126; F05D 2240/128
See application file for complete search history.

(56) References Cited

U.S. PATENT DOCUMENTS

| | | | | |
|---|---|---|---|---|
| 2,825,532 A | | 3/1958 | Kadosch et al. | |
| 4,403,917 A | * | 9/1983 | Laffitte | F01D 5/188 415/115 |
| 4,624,104 A | | 11/1986 | Stroem | |
| 5,375,972 A | | 12/1994 | Gray | |

(Continued)

FOREIGN PATENT DOCUMENTS

| | | | | |
|---|---|---|---|---|
| FR | 1263010 A | | 6/1961 | |
| WO | WO-2015157780 A1 | * | 10/2015 | F01D 5/187 |

OTHER PUBLICATIONS

Baruzzini, et al. "Fluidic Injection Flow Control for High Pressure Turbine Area Modulation—A Computational Fluid Dynamics Investigation," in 48th AIAA Aerospace Sciences Meeting Including the New Horizons Forum and Aerospace Exposition, Orlando, 2010.

(Continued)

*Primary Examiner* — Grant Moubry
*Assistant Examiner* — Ruben Picon-Feliciano

(57) ABSTRACT

A pneumatically variable nozzle vane is disclosed that is capable of performing the same or similar function as a mechanically variable nozzle vane. Within its core, each pneumatically variable nozzle vane may comprise one or more cavities in fluid communication with one or more outlets to eject a gas from the nozzle vane into a flow path of working fluid through the nozzle. Each cavity may be shaped to match an internal pressure gradient to the external pressure gradient of the nozzle vane. The gas may be ejected as a curtain, substantially perpendicular to the flow path through the nozzle, to thereby manipulate the flow of a working fluid through the nozzle in a similar manner as a mechanically variable nozzle vane. In an embodiment, each nozzle vane may have two cavities supplying outlets on both the pressure-side and suction-side of the nozzle vane.

20 Claims, 10 Drawing Sheets

(52) U.S. Cl.
CPC .. *F05D 2240/124* (2013.01); *F05D 2240/126* (2013.01); *F05D 2240/128* (2013.01)

(56) References Cited

U.S. PATENT DOCUMENTS

| | | | | | |
|---|---|---|---|---|---|
| 5,993,156 | A * | 11/1999 | Bailly | F01D 5/188 | 415/115 |
| 6,158,955 | A | 12/2000 | Caddell, Jr. et al. | | |
| 6,530,744 | B2 | 3/2003 | Liotta et al. | | |
| 8,197,209 | B2 | 6/2012 | Wagner | | |
| 8,834,116 | B2 | 9/2014 | Guemmer | | |
| 9,915,159 | B2 | 3/2018 | Huizenga et al. | | |
| 9,957,900 | B2 | 5/2018 | Baladi et al. | | |
| 11,149,549 | B2 | 10/2021 | Koda | | |
| 2009/0003989 | A1 | 1/2009 | Guemmer | | |
| 2016/0201489 | A1* | 7/2016 | Kim | F01D 5/189 | 415/177 |
| 2017/0051680 | A1 | 2/2017 | Becker, Jr. et al. | | |
| 2019/0054572 | A1 | 2/2019 | Parvis et al. | | |
| 2020/0362704 | A1* | 11/2020 | Burnes | F01D 5/148 | |

OTHER PUBLICATIONS

Domel, et al. "Pulsed Injection Flow Control for Throttling in Supersonic Nozzles—A Computational Fluid Dynamics Based Performance Correlation," in 37th AIAA Fluid Dynamics Conference, Miami, 2007.

Traub, et al. "Aerodynamic Characteristics of a Gurney/Jet Flap at Low Reynolds Numbers," Journal of Aircraft—J Aircraft, vol. 45, pp. 424-429, 3 2008.

Koklu, et al. "Comparison of Sweeping Jet Actuators with Different Flow-Control Techniques for Flow-Separation Control," AIAA Journal, vol. 55, No. 3, pp. 848-860, 2017.

Otto, et al. "Comparison Between Fluidic Oscillators and Steady Jets for Separation Control," AIAA Journal, vol. 57, pp. 1-10, 2019.

Hossian, et al. "Experimental Investigation of Sweeping Jet Film Cooling in a Transonic Turbine Cascade,"ASME Journal of Turbomachinery, vol. 142, pp. 1-38, 3 2020.

Written Opinion and International Search Report for Int'l. Patent Appln. No. PCT/US2023/022459, mailed Sep. 8, 2023 (14 pgs).

* cited by examiner

PNEUMATICALLY VARIABLE TURBINE NOZZLE

TECHNICAL FIELD

The embodiments described herein are generally directed to the nozzle of a turbine, and, more particularly, to a pneumatically variable nozzle in a turbine.

BACKGROUND

In a gas turbine engine, the pressure ratios of the compressor and turbine may be adjusted, relative to each other, according to the intended operation of the gas turbine engine. Conventionally, a pressure ratio of the turbine can be adjusted using mechanically variable nozzle vanes within the turbine. In particular, these mechanically variable nozzle vanes rotate within a range of degrees around a radial axis.

It would be beneficial to be able to use gas, such as bleed air from the compressor, to achieve the same function as mechanically variable nozzle vanes. In particular, the ejection of gas from the nozzle vanes can be used to affect the gas flow through the nozzle, in the same manner as mechanically rotating the nozzle vanes affects the gas flow through the nozzle. In other words, the inventors have determined that a pneumatically variable nozzle can perform the same function as a mechanically variable nozzle.

A number of means exist, in different contexts, for ejecting gas from nozzle vanes. For example, U.S. Patent Pub. No. 2017/0051680 discloses a nozzle for introducing bleed air into a turbine using an opening on the pressure side of each nozzle vane. U.S. Pat. No. 11,149,549 describes a blade in a steam turbine which ejects steam from openings on the pressure and suction sides. U.S. Pat. No. 6,530,744 discloses nozzle vanes with openings for conveying cooling air into the flow path of the engine.

The present disclosure is directed toward overcoming one or more of the problems discovered by the inventors. For example, conventional nozzle vanes may produce non-constant radial pressure gradients at full-load and part-load engine operating conditions, there is a limited internal geometry in nozzle vanes for core and hole placement, straight round holes through the surface of the nozzle vane may cause structural issues when placed too close to each other, and ejecting gas from the nozzle vane at a non-perpendicular angle to the flow direction through the nozzle may not be as effective in terms of manipulating the gas flow through the nozzle.

SUMMARY

In an embodiment, a nozzle vane comprises: an inlet through a first radial end of the nozzle vane; a cavity within a core of the nozzle vane, the cavity extending from the inlet towards a second radial end of the nozzle vane, wherein a cross-sectional area of the cavity, along a radial axis of the nozzle vane, decreases from the first radial end to the second radial end; and an outlet through a side surface of the nozzle vane, the outlet in fluid communication with the cavity.

In an embodiment, a nozzle vane comprises: a forward inlet through a first radial end of the nozzle vane; a forward cavity within a core of the nozzle vane, the forward cavity extending from the forward inlet towards a second radial end of the nozzle vane, wherein a cross-sectional area of the forward cavity, along a radial axis of the nozzle vane, decreases from the first radial end to the second radial end; a forward outlet through a suction-side surface of the nozzle vane; a forward channel connecting the forward cavity to the forward outlet; an aft inlet through the first radial end of the nozzle vane; an aft cavity within a core of the nozzle vane, the aft cavity extending from the aft inlet towards the second radial end, wherein a cross-sectional area of the aft cavity, along the radial axis, decreases from the first radial end to the second radial end; an aft outlet through a pressure-side surface of the nozzle vane; and an aft channel connecting the aft cavity to the aft outlet.

In an embodiment, a gas turbine engine comprises: a compressor; a combustor downstream from the compressor; and a turbine downstream from the combustor, wherein the turbine includes a nozzle comprising a plurality of nozzle vanes arranged annularly around a longitudinal axis of the gas turbine engine, and wherein each of the plurality of nozzle vanes includes an inlet through a first radial end of the nozzle vane, a cavity within a core of the nozzle vane, the cavity extending from the inlet towards a second radial end of the nozzle vane, wherein a cross-sectional area of the cavity, along a radial axis of the nozzle vane, decreases from the first radial end to the second radial end, and an outlet through a side surface of the nozzle vane, the outlet in fluid communication with the cavity.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
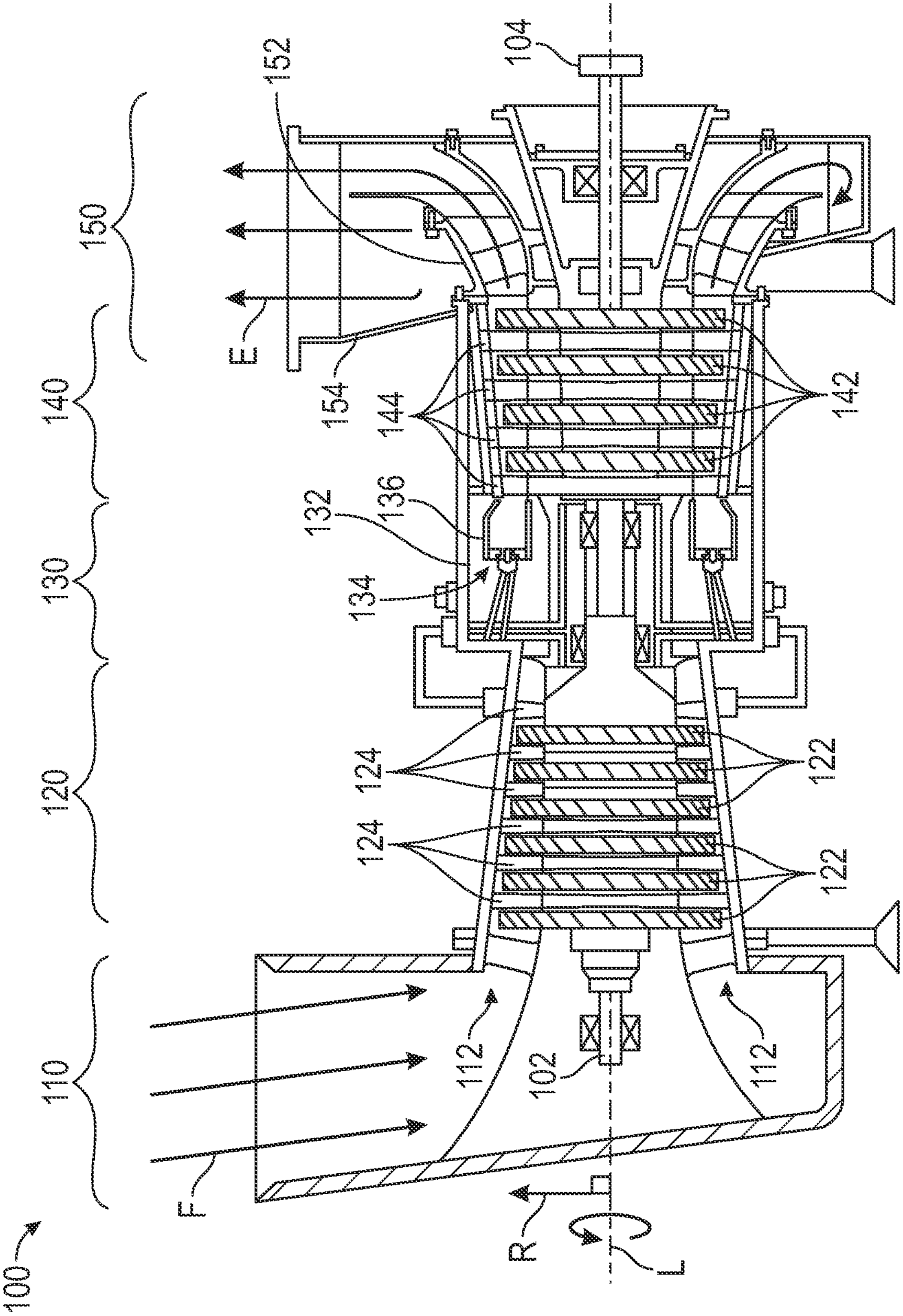
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground).

It should also be understood that the various components illustrated herein are not necessarily drawn to scale. In other words, the features disclosed in various embodiments may be implemented using different relative dimensions within and between components than those illustrated in the drawings.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F (e.g., the primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a compressor stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives turbine 140.

Turbine 140 may comprise one or more turbine rotor assemblies 142 and stator assemblies 144. A turbine stator assembly 144 may also be referred to herein as a "nozzle" and comprises a plurality of nozzle vanes extending radially and arranged annularly around longitudinal axis L. Each turbine rotor assembly 142 may correspond to one of a plurality or series of stages. Turbine 140 extracts energy from the combusting fuel-gas mixture as it passes through each stage. The energy extracted by turbine 140 may be transferred via power output coupling 104 (e.g., to an external system), as well as to compressor 120 via shaft 102.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2A:
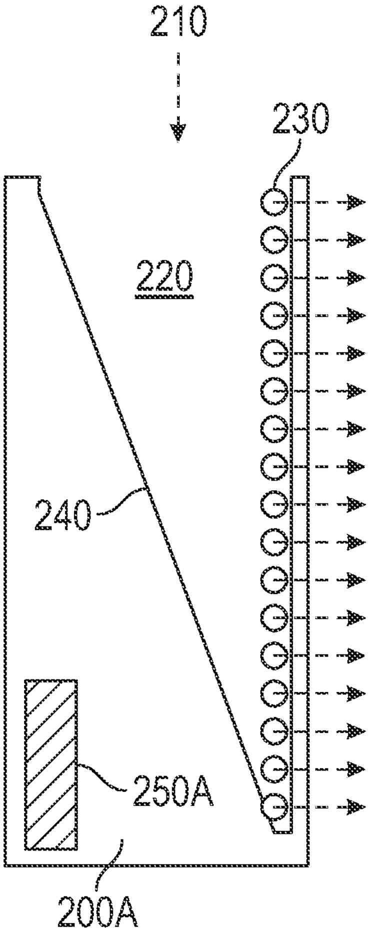
FIGS. 2A-2C illustrate the general operation of embodiments of a pneumatically variable nozzle vane, using cross-sectional views, in elevation, of simplified rectangular vanes, according to examples.
Figure 2B:
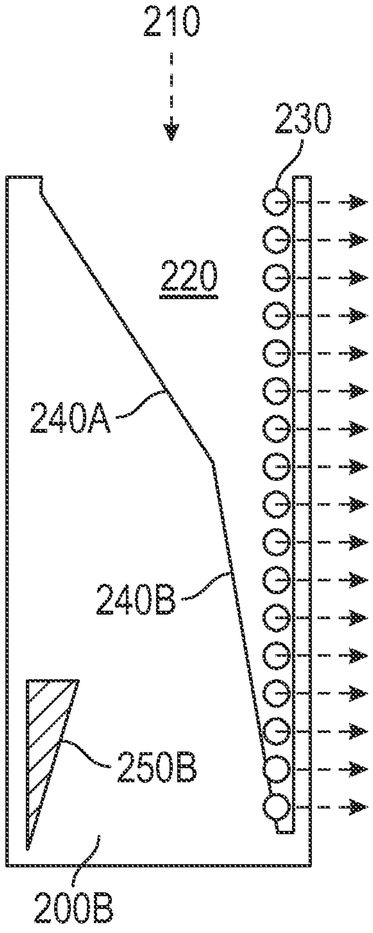
Figure 2C:
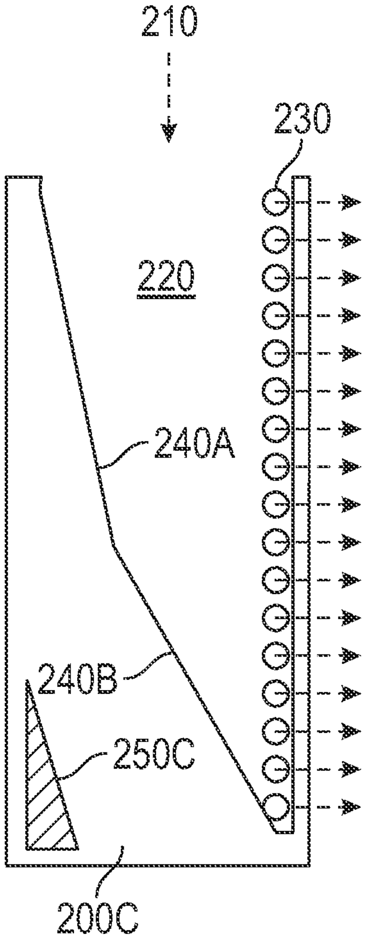

FIGS. 2A-2C illustrate the general operation of an embodiment of a pneumatically variable nozzle vane, using cross-sectional views, in elevation, of simplified rectangular vanes, according to three examples. Each pneumatically variable nozzle vane 200 comprises a cavity 220 extending into its core. A gas (e.g., air) is injected into cavity 220 via an inlet 210. The gas may be bleed air that is supplied, via a bleed circuit, from a stage or output of compressor 120 to inlet 210 of each nozzle vane 200. The gas is ejected from cavity 220 of each nozzle vane 200 through one or more openings 230. Each opening 230 may be formed through a side surface of nozzle vane 200, as described in more detail elsewhere herein, so as to be injected into the path of working fluid F that is flowing through adjacent nozzle vanes 200 (e.g., from combustor 130).

Cavity 220 may be defined by a tapered surface 240, such that the cross-sectional area of cavity 220, cut in a plane that is perpendicular to a radial axis, decreases from one end to the other end, along the radial axis. As illustrated, each cavity 220 decreases in cross-sectional area from the open end of cavity 220 at which inlet 210 is located to the opposite and closed end of cavity 220.

Tapered surface 240 is depicted in only a few linear-based examples to illustrate the general operation of nozzle vane 200. In reality, tapered surface 240 may be formed in more complex shapes, with curvatures and other geometric profiles, that decrease in cross-sectional area from the open end to the closed end of cavity 220. In particular, tapered surface 240 may be designed to produce the desired internal pressure distribution within cavity 220. For example, nozzle vane 200A comprises a perfectly proportional tapered surface 240 to produce a uniform internal pressure gradient 250A across cavity 220 from one end to the opposite end. Thus, the static pressure at each opening 230 will be the same. As another example, nozzle vane 200B comprises a first tapered surface 240A that varies (e.g., accelerates) the flow of gas across the subset of openings 230 that precede the transition to a second tapered surface 240B. This produces an internal pressure gradient 250B that has the highest static pressure at the opening 230 that is nearest inlet 210, and decreases to its lowest static pressure at the opening 230 that is farthest from inlet 210. As a further example, nozzle vane 200C comprises a first tapered surface 240A that varies (e.g., decelerates) the flow of gas across the first subset of openings 230 that precede the transition to a second tapered surface 240B. This produces an internal pressure gradient 250C that has the lowest static pressure at the opening 230 that is nearest inlet 210, and increases to its highest static pressure at the opening 230 that is farthest from inlet 210. In an embodiment, tapered surface 240 may be designed to produce an internal pressure gradient that matches the external pressure gradient along the radial span of nozzle vane 200, such that the gas is ejected from all openings 230 at a constant pressure. It should be understood that the internal pressure gradients 250A, 250B, and 250C illustrated in FIGS. 2A, 2B, and 2C, respectively, are not physical features of nozzle vanes 200, but rather, are overlays to demonstrate the basic internal pressure gradients 250 produced by the respective tapered surfaces 240.

Figure 3:
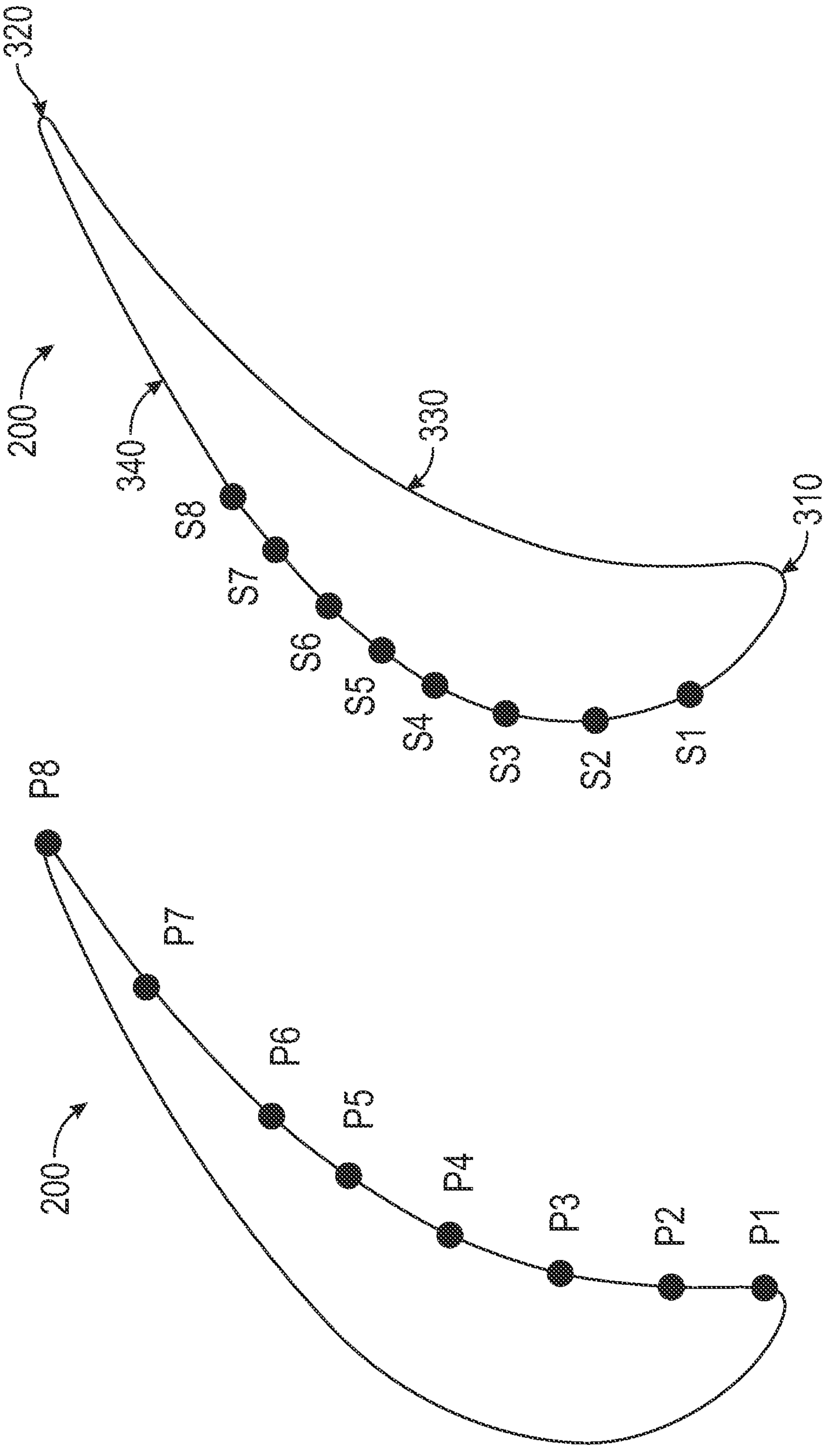
FIG. 3 illustrates the profiles of two adjacent nozzle vanes, viewed down a radial axis, according to an embodiment.

FIG. 3 illustrates the profiles of two adjacent nozzle vanes 200, viewed down a radial axis, according to an embodiment. Each nozzle vane 200 may comprise a leading edge 310 and a trailing edge 320. In addition, each nozzle vane 200 may comprise a pressure-side surface 330 and a suction-side surface 340. Points P1, P2, P3, P4, P5, P6, P7, and P8 represent various locations at which gas may be ejected from nozzle vane 200 through pressure-side surface 330, and points S1, S2, S3, S4, S5, S6, S7, and S8 represent various locations at which gas may be ejected from nozzle vane 200 through suction-side surface 340. It should be understood that these points merely represent a sampling of locations which may be used as reference points herein, and that gas may be ejected from nozzle vane 200 at any point along pressure-side surface 330 and/or suction-side surface 340. The following table provides the positions of the points as percentages of curve-wise length along their respective surfaces from leading edge 310 to trailing edge 320. It should be understood that these points are just given as example references and that, although depicted as values to two decimal places, such precise values are not a requirement of any embodiment, and less precise values are contemplated.

| Pressure-Side Surface | | Suction-Side Surface | |
|---|---|---|---|
| Point | Curve-Wise % | Point | Curve-Wise % |
| P1 | 3.12 | S1 | 12.79 |
| P2 | 13.88 | S2 | 22.76 |
| P3 | 27.02 | S3 | 31.97 |
| P4 | 40.19 | S4 | 39.55 |
| P5 | 52.70 | S5 | 45.64 |

-continued

| Pressure-Side Surface | | Suction-Side Surface | |
|---|---|---|---|
| Point | Curve-Wise % | Point | Curve-Wise % |
| P6 | 62.99 | S6 | 51.78 |
| P7 | 81.24 | S7 | 57.72 |
| P8 | 98.13 | S8 | 64.82 |

A turbine stator assembly 144 may comprise a plurality of nozzle vanes 200 arranged circumferentially, along radial axes, around longitudinal axis L. It should be understood that each nozzle vane 200 may be affixed to an inner annular structure on a radially inward end and an outer annular structure on a radially outward end, to be thereby held within a flow path of working fluid F through turbine 140. Thus, working fluid F (e.g., exiting combustor 130) will flow between each pair of adjacent nozzle vanes 200.

As illustrated in FIGS. 2A-2C, each nozzle vane 200 may have an inlet end in which one or more inlets 210 are formed and a closed end opposite the inlet end. Nozzle vanes 200 may be oriented such that the inlet end is the radially inward end (e.g., affixed to an inner annular structure) or may be oriented such that the inlet end is the radially outward end (e.g., affixed to an outer annular structure), depending on the particular design of turbine 140, the bleed circuit within gas turbine engine 100, and/or the like. Thus, it should be understood that, while the disclosed embodiments may be illustrated with the inlet end of nozzle vane 200 as the radially inward end, the disclosed embodiments may just as easily be implemented with the inlet end of nozzle vane 200 as the radially outward end.

In either case, each inlet 210 may be connected to a gas circuit (e.g., bleed circuit) within the annular structure to which it is affixed, such that gas is supplied from the gas circuit through each inlet 210 into the respective cavity 220. Although not shown, gas turbine engine 100 may include a pneumatic variable turbine gas delivery system, comprising pipes and/or ducts that form the flow path(s) of the gas circuit (e.g., bleed circuit), one or more control valves, one or more manifolds, and/or the like. The pneumatic variable turbine gas delivery system may also comprise one or more controllers that are able to control other components of the pneumatic variable turbine gas delivery system, such as the control valve(s), to deliver gas (e.g., from the output or one or more stages of compressor 120) to nozzle vanes 200 of a nozzle, as needed and according to one or more controlled parameters, such as volume, pressure, temperature, gas mixture, and/or the like, to achieve the desired flow capacity of the main flow of working fluid F through the nozzle.

Figure 4:
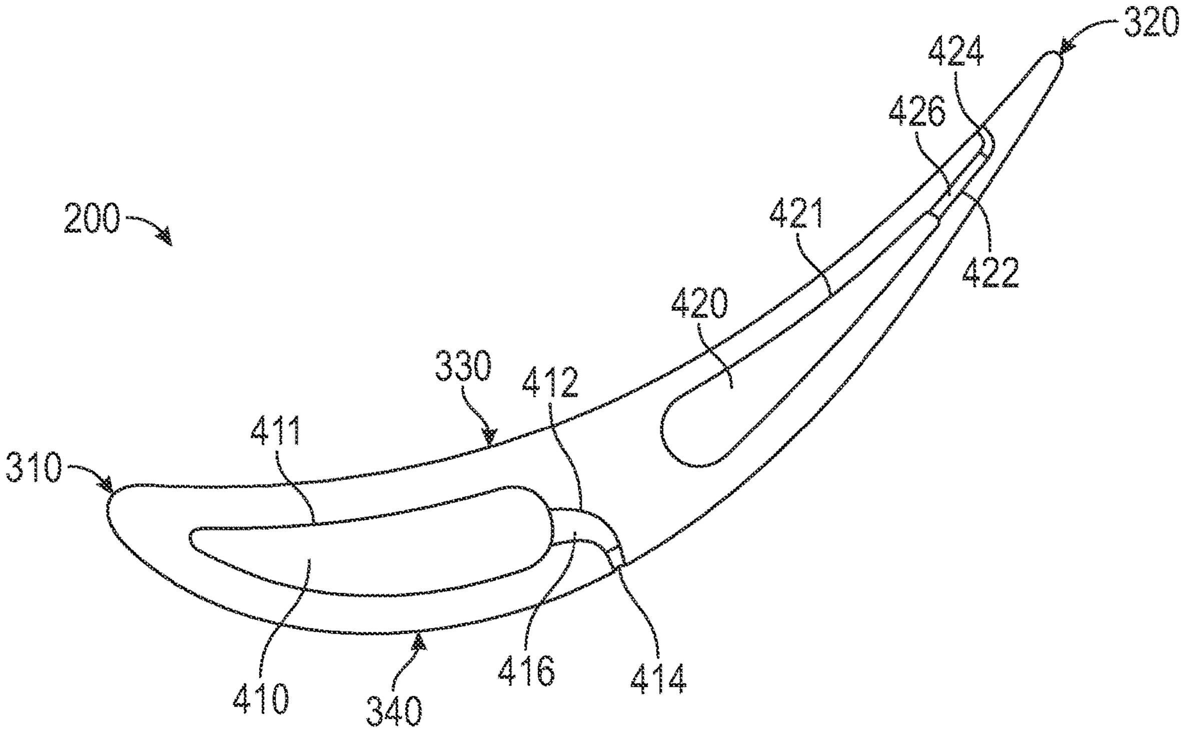
FIGS. 4-6 illustrate a pneumatically variable nozzle vane, according to a first embodiment.
Figure 5:
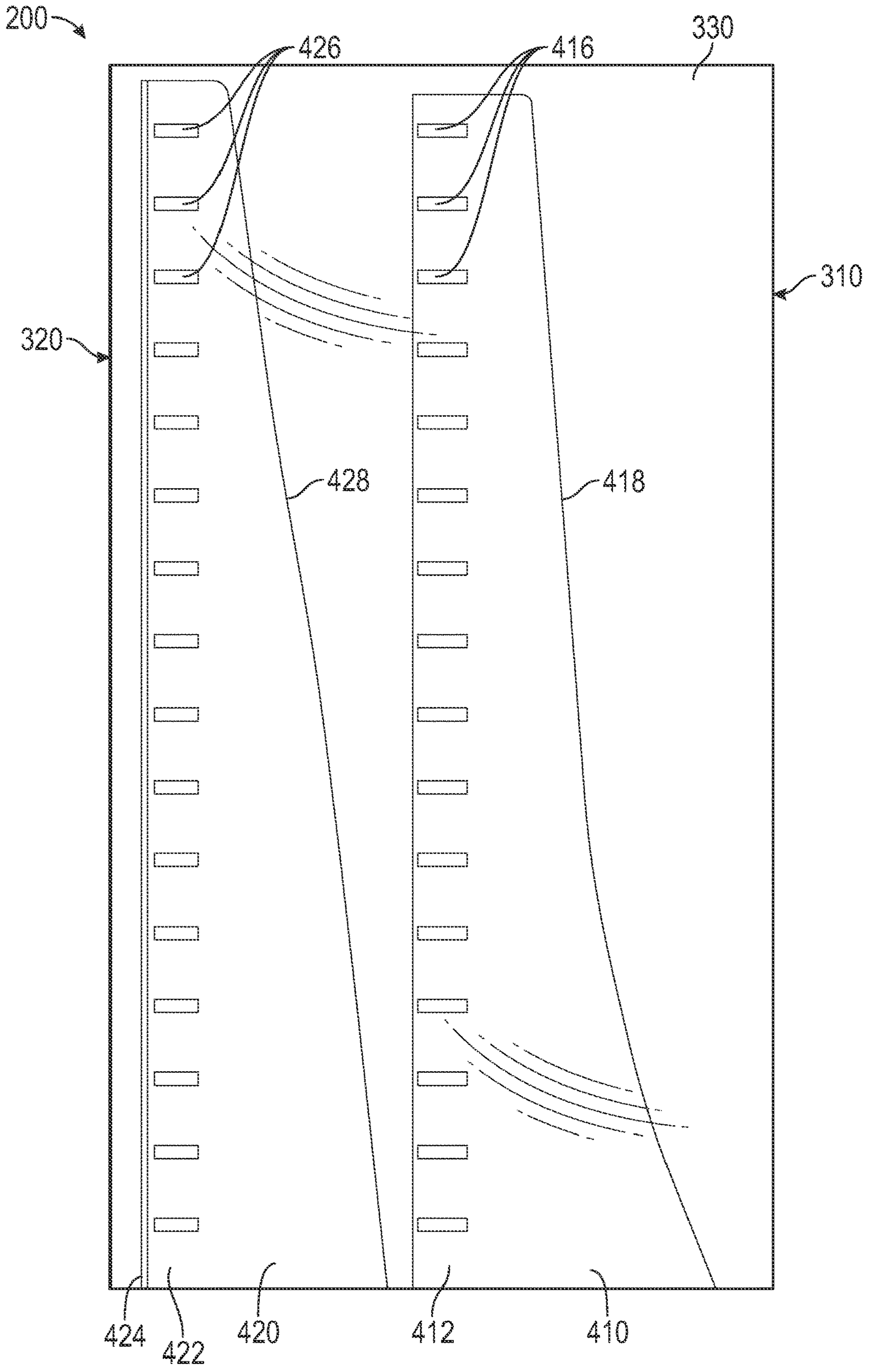
Figure 6:
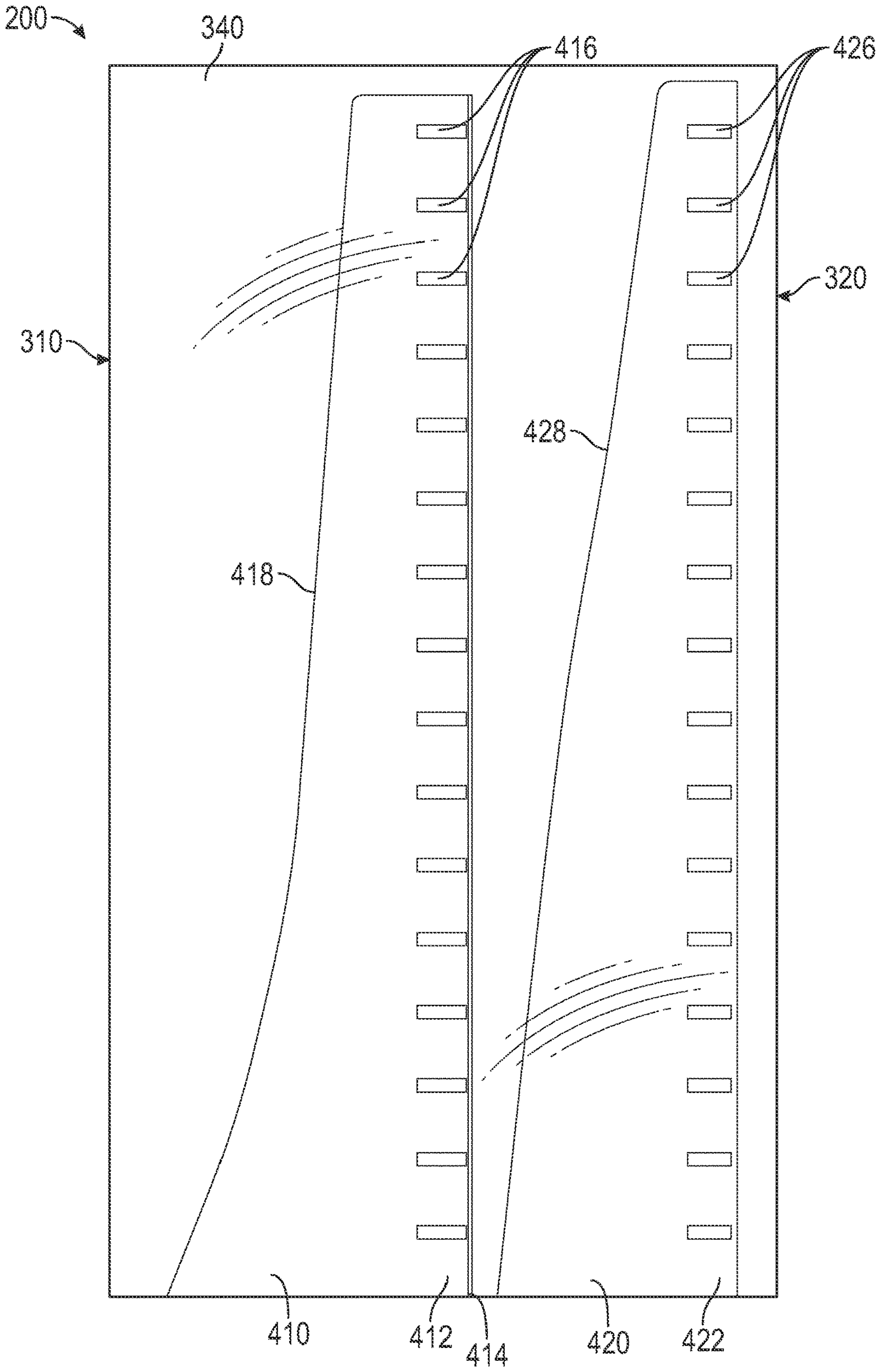

FIGS. 4-6 illustrate a pneumatically variable nozzle vane 200, according to a first embodiment. In particular, FIG. 4 illustrates a view of the inlet end of nozzle vane 200 down a radial axis of nozzle vane 200, FIG. 5 illustrates a transparent view of pressure-side surface 330 of nozzle vane 200, and FIG. 6 illustrates a transparent view of suction-side surface 340 of nozzle vane 200, according to the first embodiment.

As illustrated in FIG. 4, the inlet end of nozzle vane 200 comprises a forward inlet 411 which provides a flow path into a forward cavity 410, and an aft inlet 421 which provides a flow path into an aft cavity 420. Forward cavity 410 is closer to leading edge 310 than aft cavity 420, and aft cavity 420 is closer to trailing edge 320 than forward cavity 410. It should be understood that, conceptually, forward inlet 411 and aft inlet 421 each correspond to inlet 210 in FIGS.

2A-2C. In addition, conceptually, forward cavity 410 and aft cavity 420 each correspond to cavity 220 in FIGS. 2A-2C.

Forward cavity 410 is in fluid communication with a channel 412 that provides a flow path to an outlet 414. Outlet 414 provides a flow path through suction-side surface 340 from channel 412 to an exterior of nozzle vane 200. As illustrated, channel 412 may be substantially narrower than forward cavity 410, and may narrow from forward cavity 410 to outlet 414. However, in an alternative embodiment, channel 412 may have a width that is similar to, the same as, or larger than the width of forward cavity 410, and/or may have a constant width or widen from forward cavity to outlet 414. It should be understood that, conceptually, outlet 414 corresponds to opening(s) 230 in FIGS. 2A-2C, but may be formed as one elongated opening, instead of a plurality of separate openings.

Channel 412 may comprise one or more ribs 416 extending across channel 412 to provide structural support to nozzle vane 200. As illustrated in FIGS. 5 and 6, a plurality of ribs 416 may be formed at equidistant intervals along a radial axis through channel 412. These ribs 416 may divide a portion of channel 412 into a plurality of separated channels. However, another portion of channel 412—for example, between the rib-divided portion of channel 412 and outlet 414—may remain undivided.

In the illustrated embodiment, channel 412 extends from an aft portion of forward cavity 410 and then curves such that outlet 414 extends through suction-side surface 340 at a substantially (e.g., +/−5° or +/−10°) perpendicular angle to suction-side surface 340 at the position of outlet 414. In other words, gas will be ejected out of outlet 414 at an angle that is substantially perpendicular to working fluid F flowing over suction-side surface 340. As illustrated in FIG. 6, outlet 414 may comprise a single, continuous, elongate, radial opening through suction-side surface 340. The radial length of outlet 414 may match (i.e., be identical or similar to) the radial length from one radial end of forward cavity 410 to the opposite radial end of forward cavity 410. Consequently, a curtain of gas will be ejected out of outlet 414 along the entire radial span of forward cavity 410. In an embodiment, outlet 414 is positioned on suction-side surface 340 at a point between points S4 and S6, such as at point S4 (i.e., 39.55% curve-wise, or −18% from the throat defined by a line traversing the closest distance between a pair of adjacent nozzle vanes 200, which would be defined by points S7 and P8 in the illustrated example), at point S5 (i.e., 45.64% curve-wise, or −12% from the throat), or at point S6 (i.e., 51.78% curve-wise, or −6% from the throat).

In an embodiment, gas flows through forward inlet 411 into forward cavity 410, flows from forward cavity 410 into the plurality of rib-divided channels in a first portion of channel 412, converges in a second portion of channel 412, and is ejected as a curtain of gas, which is substantially perpendicular to suction-side surface 340, from a single, continuous, elongate, radial outlet 414. However, it should be understood that this is one example embodiment, and that other embodiments are possible. For instance, in alternative embodiments, ribs 416 could be omitted, ribs 416 could extend the entire length of channel 412, ribs 416 could extend along a different portion of channel 412, outlet 414 could be formed as a plurality of separate openings, channel 412 and/or outlet 414 may be configured to eject gas at a non-perpendicular angle with respect to suction-side surface 340 (e.g., at a non-perpendicular downstream angle), and/or the like.

As illustrated, forward cavity 410 may comprise a tapered surface 418. It should be understood that, conceptually, tapered surface 418 corresponds to tapered surface 240 in FIGS. 2A-2C. In the illustrated embodiment, tapered surface 418 initially has a less steep slope, relative to a radial axis, so as to vary (e.g., accelerate) the flow through forward cavity 410, before transitioning to a steeper slope, relative to the radial axis. Thus, tapered surface 418 will produce an internal pressure gradient similar to internal pressure gradient 250B.

Aft cavity 420 is in fluid communication with a channel 422 that provides a flow path to an outlet 424. Outlet 424 provides a flow path through pressure-side surface 330 from channel 422 to an exterior of nozzle vane 200. As illustrated, channel 422 may extend from cavity 420 towards trailing edge 320, and then curve or otherwise turn towards pressure-side surface 330 to connect to outlet 424. On pressure-side surface 330, the effectiveness of gas ejection tends to increase as the distance from trailing edge 320 decreases. Thus, in an embodiment, outlet 424 is positioned on pressure-side surface 330 between points P7 and P8. It should be understood that, conceptually, outlet 424 corresponds to opening(s) 230 in FIGS. 2A-2C, but may be formed as one elongated opening, instead of a plurality of separate openings.

Channel 422 may comprise one or more ribs 426 extending across channel 422 to provide structural support to nozzle vane 200. As illustrated in FIGS. 5 and 6, a plurality of ribs 426 may be formed at equidistant intervals along a radial axis through channel 422. These ribs 426 may divide a portion of channel 422 into a plurality of separated channels. However, another portion of channel 422—for example, between the rib-divided portion of channel 422 and outlet 424—may remain undivided.

In the illustrated embodiment, channel 422 extends from an aft portion of aft cavity 420 and then curves such that outlet 424 extends through pressure-side surface 330 at a substantially (e.g., +/−5° or +/−10°) perpendicular angle to pressure-side surface 330 at the position of outlet 424. In other words, gas will be ejected out of outlet 424 at an angle that is substantially perpendicular to working fluid F flowing over pressure-side surface 330. As illustrated in FIG. 5, outlet 424 may comprise a single, continuous, elongate, radial opening through pressure-side surface 330. The radial length of outlet 424 may match (i.e., be identical or similar to) the radial length from one radial end of aft cavity 420 to the opposite radial end of aft cavity 420. Consequently, a curtain of gas will be ejected out of outlet 424 along the entire radial span of aft cavity 420. In an embodiment, outlet 424 is positioned on pressure-side surface 330 between points P7 and P8, including, for example, at point P7 (i.e., 81.24% curve-wise), point P7.25 (i.e., 85.84% curve-wise), or point P7.5 (i.e., 89.65% curve-wise). It is generally beneficial for outlet 424 to be positioned as close to trailing edge 320, roughly corresponding to point P8, as possible within the given manufacturing constraints.

In an embodiment, gas flows through aft inlet 421 into aft cavity 420, flows from aft cavity 420 into the plurality of rib-divided channels in a first portion of channel 422, converges in a second portion of channel 422, and is ejected as a curtain of gas, which is substantially perpendicular to pressure-side surface 330, from a single, continuous, elongate, radial outlet 424. However, it should be understood that this is one example embodiment, and that other embodiments are possible. For instance, in alternative embodiments, ribs 426 could be omitted, ribs 426 could extend the entire length of channel 422, ribs 426 could extend along a different portion of channel 422, outlet 424 could be formed as a plurality of separate openings, channel 422 and/or outlet 424 may be configured to eject gas at a non-perpendicular angle with respect to pressure-side surface 330 (e.g., at a non-perpendicular downstream angle), and/or the like.

As illustrated, cavity 420 may comprise a tapered surface 428. It should be understood that, conceptually, tapered surface 428 corresponds to tapered surface 240 in FIGS. 2A-2C. In the illustrated embodiment, tapered surface 428 has a generally uniform slope from end to end. Thus, tapered surface 428 will produce an internal pressure gradient similar to internal pressure gradient 250A.

Figure 7:
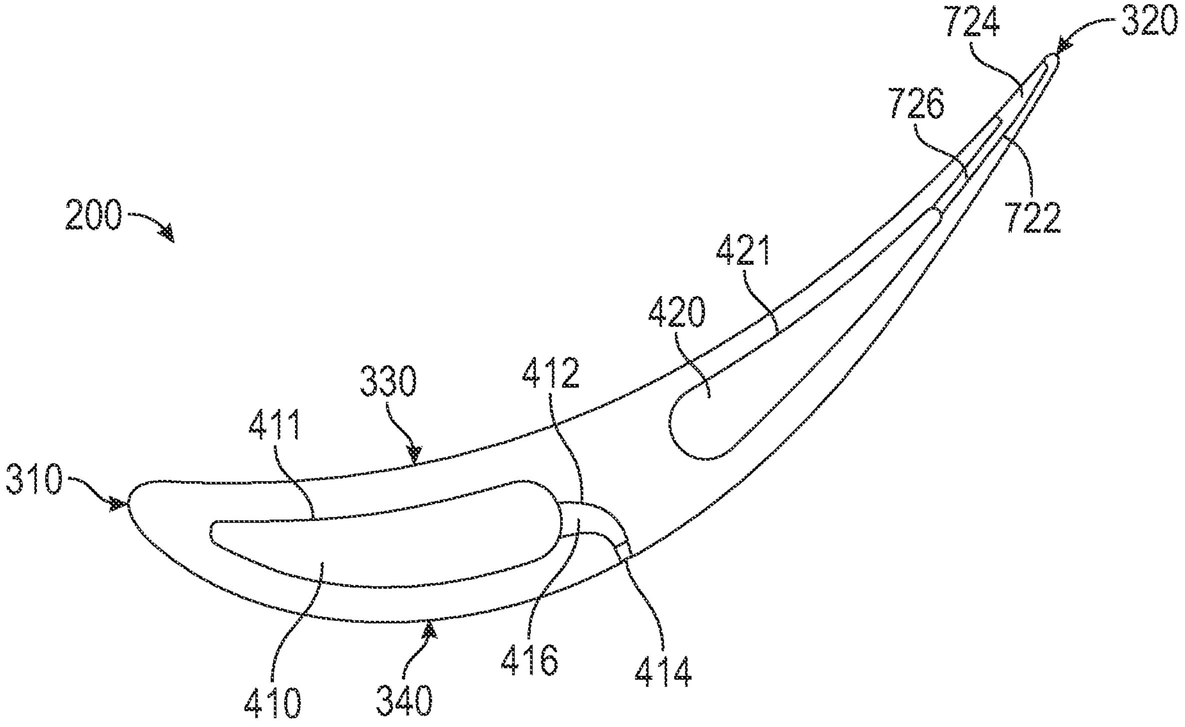
FIGS. 7-10 illustrate a pneumatically variable nozzle vane, according to a second embodiment.
Figure 8:
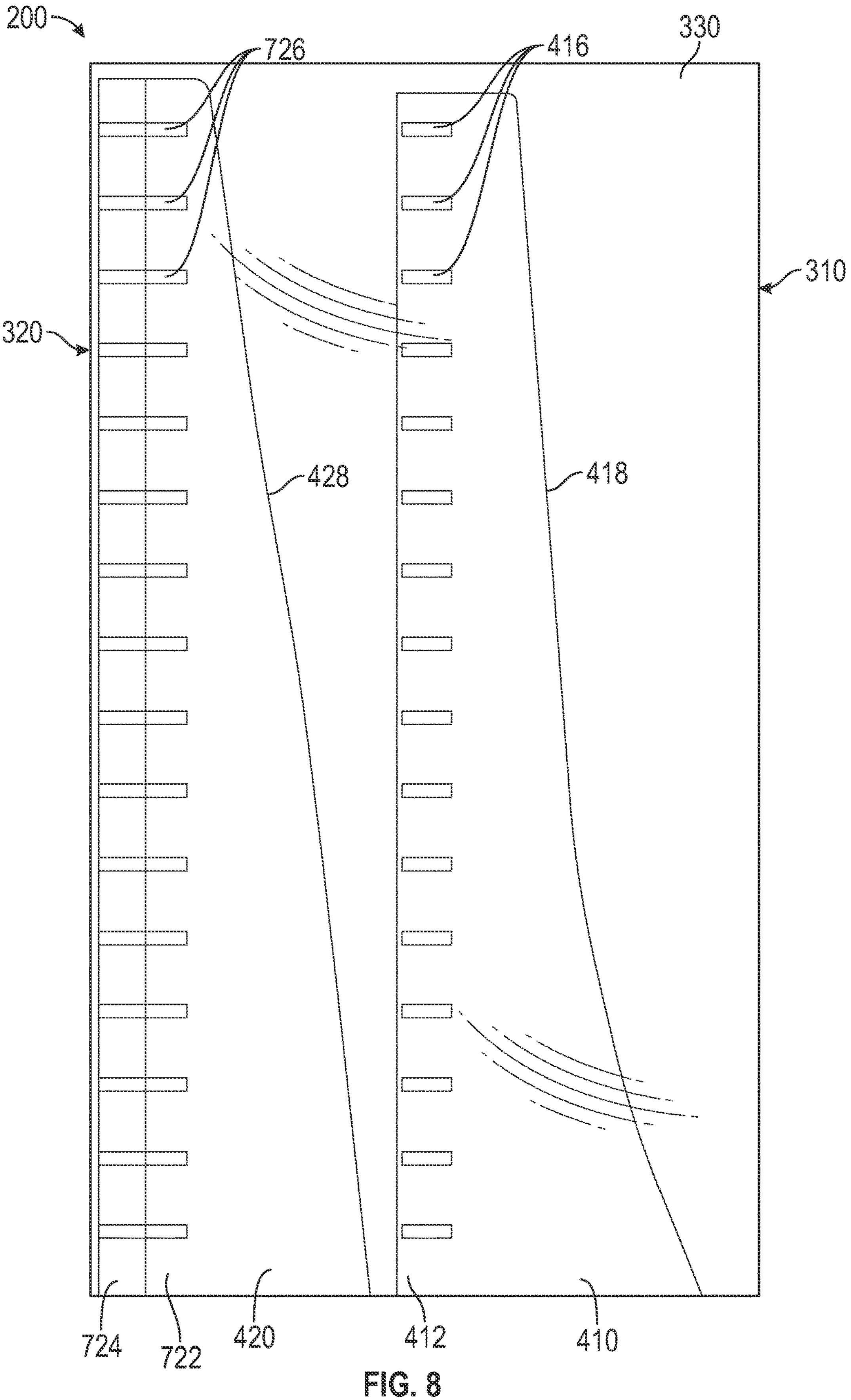
Figure 9:
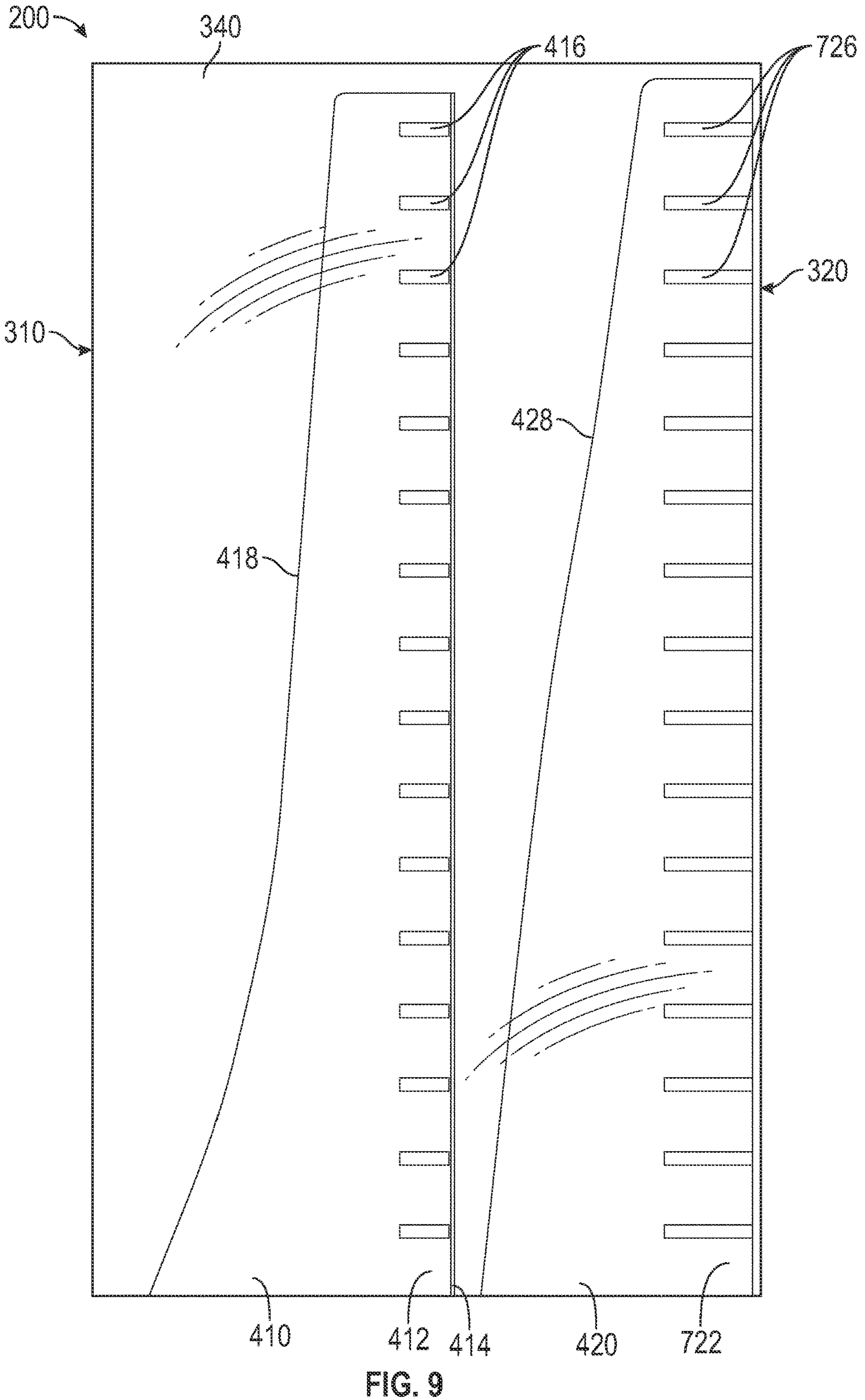
Figure 10:
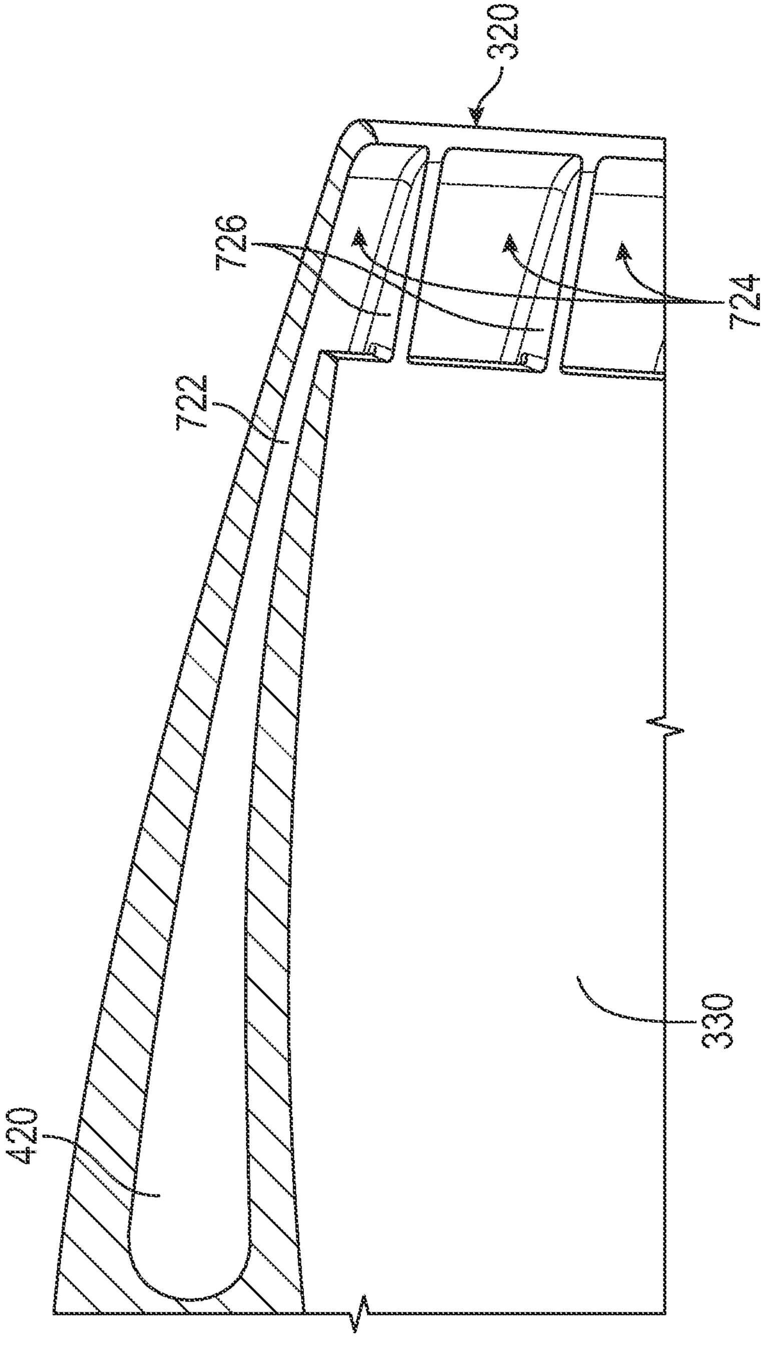

FIGS. 7-10 illustrate a pneumatically variable nozzle vane 200, according to a second embodiment. In particular, FIG. 7 illustrates a view of the inlet end of nozzle vane 200 down a radial axis of nozzle vane 200, FIG. 8 illustrates a transparent view of pressure-side surface 330 of nozzle vane 200, FIG. 9 illustrates a transparent view of suction-side surface 340 of nozzle vane 200, and FIG. 10 illustrates a perspective view of a cross-sectioned portion of trailing edge 320 of nozzle vane 200, according to the second embodiment. The second embodiment differs from the first embodiment in the configuration of the channel and outlet from aft cavity 420. In all other respects, the second embodiment may be similar or identical to the first embodiment. Thus, the descriptions of forward inlet 412, forward cavity 410, channel 412, outlet 414, ribs 416, and tapered surface 418, as well as aft inlet 421, aft cavity 420, and tapered surface 428, with respect to the first embodiment, apply equally to those same components in the second embodiment.

As illustrated in FIG. 7, aft cavity 420 is in fluid communication with a channel 722 that provides a flow path to an outlet 724. Outlet 724 provides a flow path through pressure-side surface 330 from channel 722 to an exterior of nozzle vane 200. Channel 722 may extend from aft cavity 420 towards and as close to trailing edge 320 as possible, to connect to outlet 724. For example, the trailing end of outlet 724 may correspond to point P8. Notably, outlet 724 may be wider in the second embodiment than outlet 424 in the first embodiment, to enable the trailing end of outlet 724 to be positioned closer to trailing edge 320. In essence, channel 722 is formed as a linear channel, or a channel with a slight curve that follows the curvature of pressure-side surface 330 and/or suction-side surface 340, extending from an aft portion of aft cavity 420 towards trailing edge 320, with a portion of pressure-side surface 330 near trailing edge 320 removed to form outlet 724, which exposes the trailing end of channel 722.

Channel 722 may comprise one or more ribs 726 extending across channel 722 to provide structural support to nozzle vane 200. As illustrated in FIGS. 8 and 9, a plurality of ribs 726 may be formed at equidistant intervals along a radial axis through channel 722. These ribs 726 may divide at least portion of channel 722 into a plurality of separated channels. In the illustrated embodiment, ribs 726 divide the entirety of channel 722 into a plurality of separated channels. However, in an alternative embodiment, ribs 726 may divide only a portion (e.g., a forward portion, a middle portion, or an aft portion) of channel 722 into a plurality of separated channels.

In the illustrated embodiment, channel 722 joins outlet 724 to provide a flow path through pressure-side surface 330 at a substantially (e.g., +/−5° or +/−10°) perpendicular angle to pressure-side surface 330. In other words, gas will be ejected out of outlet 724 at an angle that is substantially perpendicular to working fluid F flowing over pressure-side surface 330. As illustrated in FIG. 10, outlet 724 may be formed as a plurality of rectangular openings through pressure-side surface 330. The rectangular openings are formed by the extension of ribs 726 across outlet 724. In an alternative embodiment, ribs 726 could stop short of outlet 724, such that outlet 724 comprises a single, continuous, elongate, radial opening through pressure-side surface 330, with a radial length that matches (i.e., is identical or similar to) the radial length from one radial end of aft cavity 420 to the opposite radial end of aft cavity 420.

In an embodiment, gas flows through aft inlet 421 into aft cavity 420, flows from aft cavity 420 into the plurality of rib-divided channels in channel 722, and is ejected as a curtain of gas, which is substantially perpendicular to pressure-side surface 330, from the openings of outlet 724. However, it should be understood that this is one example embodiment, and that other embodiments are possible. For instance, in alternative embodiments, ribs 726 could be omitted, ribs 726 could extend less than the entire length of channel 722, outlet 724 could be formed as a single, continuous, elongate opening, channel 722 and/or outlet 724 may be configured to eject gas at a non-perpendicular angle with respect to pressure-side surface 330, and/or the like.

Both the first embodiment and the second embodiment of nozzle vane 200 have been illustrated with a forward cavity 410, supplying gas through suction-side surface 340 via a first path (i.e., comprising channel 412 and outlet 414), and a separate aft cavity 420, supplying gas through pressure-side surface 330 via a second path (i.e., comprising channel 422/722 and outlet 424/724). However, in an alternative embodiment, a single cavity may supply gas to both the first path and the second path. In this case, nozzle vane 200 may consist of a single cavity in its core, and both the first path through suction-side surface 340 and the second path through pressure-side surface 330 may extend (e.g., as a linear or curved channel) from the same point or different points of the cavity to their respective outlets, which may be positioned in the same locations as illustrated herein or in different positions than illustrated herein. Notably, in this alternative embodiment, the second path through pressure-side surface 330 may be implemented using the same channel 422 and outlet 424 (e.g., with or without ribs 426) or channel 722 and outlet 724 (e.g., with or without ribs 726) as described herein. On the other hand, the first path may be implemented differently, depending on the shape and positioning of the cavity, but may still comprise a curved or linear channel (e.g., with or without ribs) through outlet 414.

In another alternative embodiment, each nozzle vane 200 may consist of only a single cavity, supplying gas through only a single surface via a single path. As yet another alternative embodiment, each nozzle vane 200 may consist of a single cavity, supplying gas through a single surface via two or more paths. As yet another alternative embodiment, each nozzle vane 200 may comprise two or more cavities, supplying gas through a single surface via two or more paths. In these cases, the single surface may be either pressure-side surface 330 or suction-side surface 340. It should be understood that other configurations of one or more cavities and one or more ejection points through one or more surfaces are also possible. Regardless of the particular configuration, each cavity may be shaped to produce a desired internal pressure gradient, as described elsewhere herein (e.g., via tapered surface 240, 418, or 428), and each path may comprise a channel (e.g., channel 412, 422, or 722) and an outlet (e.g., outlet 414, 424, or 724) that are configured to eject gas at a desired angle (e.g., substantially perpendicular to the main flow through the nozzle, at a non-perpendicular downstream angle to the main flow through the nozzle, etc.), to thereby affect the main flow of working fluid F through the nozzle, as described throughout.

INDUSTRIAL APPLICABILITY

A nozzle comprises a plurality of nozzle vanes spaced equidistantly apart and arranged circumferentially around longitudinal axis L. Instead of, or in addition to, using mechanically variable nozzle vanes, disclosed embodiments utilize pneumatically variable nozzle vanes to affect the flow of gas (e.g., working fluid F) through the nozzle (i.e., between annularly arranged nozzle vanes). For example, such a nozzle may be comprised in a turbine 140, as a turbine stator assembly 144, such as the turbine stator assembly 144 in the first stage of turbine 140. However, such a nozzle could alternatively or additionally be comprised in one or more subsequent stage(s) of stator assemblies 144 in turbine 140, and/or may be comprised in one or more stages of stator assemblies 124 in compressor 120.

Each nozzle vane may comprise one or more cavities (e.g., 410, 420) in its core. Each cavity may comprise a tapered surface (e.g., 418, 428) that is shaped to produce a desired internal pressure gradient. For example, the tapered surface (e.g., 418, 428) may be shaped to produce an internal pressure gradient that matches the external pressure gradient along the radial span of nozzle vane 200. Since the strength at which the outlets (e.g., 414, 424, 724) eject gas is driven by the pressure difference between the interior and exterior of each nozzle vane 200, matching the internal and external pressure gradients will produce an ejected curtain of gas that has uniform or constant strength across the entire outlet (e.g., 414, 424, 724).

To utilize the limited internal geometry of nozzle vane 200 for efficient flow control, each cavity (e.g., 410, 420) may comprise a channel (e.g., 412, 422, 722) that creates an ejection path from the outlet (e.g., 414, 424, 724) that is substantially perpendicular to the flow path through the nozzle. The outlet (e.g., 414, 424, 724) may be a single, continuous, radially elongated, opening, such that a continuous curtain of gas is ejected perpendicularly into the flow path through the nozzle across the radial span of each nozzle vane. Such an outlet (e.g., 414, 424, 724) obviates the need to create closely-spaced straight, round holes through the surface of each nozzle vane 200, which may cause structural issues. To further mitigate structural issues, ribs (e.g., 416, 426, 726) may be provided within the channel (e.g., 412, 422, 722) to increase structural integrity.

While embodiments of nozzle vane 200 have primarily been described herein with respect to controlling the flow of working fluid F (e.g., the flow capacity of working fluid F) through a nozzle using a disruptive curtain of ejected gas, nozzle vanes 200 with the same or similar structure may be used for other applications. For example, in an alternative application, nozzle vanes 200 may be used to mix coolant (e.g., gas bled from compressor 120) into working fluid F as it flows through the nozzle, in addition to or instead of disrupting the flow of working fluid F through the nozzle. It should be understood that the angle at which the coolant is ejected from the outlet(s) (e.g., 414, 424, 724) and/or the location of the outlet(s) (e.g., 414, 424, 724) of each nozzle vane 200 may be set differently depending on the particular application, but all other features may remain substantially the same.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a turbomachine, it will be appreciated that it can be implemented in various other types of machines with vanes, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A nozzle vane comprising:

an inlet through a first radial end of the nozzle vane;

a cavity within a core of the nozzle vane, the cavity extending from the inlet towards a second radial end of the nozzle vane and terminating at a closed end opposite the inlet, the cavity being defined by a tapered surface that extends between the inlet and the closed end, such that a cross-sectional area of the cavity, along a radial axis of the nozzle vane, decreases from the first radial end to the second radial end; and an outlet through a side surface of the nozzle vane, the outlet in fluid communication with the cavity.

2. The nozzle vane of claim 1, further comprising a channel between the cavity and the outlet, the channel forming a flow path through the outlet, wherein the flow path through the outlet is substantially perpendicular to the side surface.

3. The nozzle vane of claim 2, wherein the channel comprises a plurality of ribs, separated along the radial axis, that divide at least a portion of the channel into a plurality of channels.

4. The nozzle vane of claim 2, wherein the channel extends from an aft portion of the cavity and curves towards the outlet.

5. The nozzle vane of claim 2, wherein the channel extends from an aft portion of the cavity towards a trailing edge of the nozzle, with a trailing end of the channel exposed by the outlet.

6. The nozzle vane of claim 5, further comprising a plurality of ribs, separated along the radial axis, that divide at least a portion of the channel into a plurality of channels and divide the outlet into a plurality of openings.

7. The nozzle vane of claim 1, wherein the outlet consists of a single, continuous, elongate opening that has a radial length that matches a length of the cavity from the first radial end to the second radial end.

8. The nozzle vane of claim 1, further comprising a plurality of the cavity and a plurality of the outlet, each of the plurality of the outlet in fluid communication with a respective one of the plurality of the cavity.

9. The nozzle vane of claim 8, wherein the plurality of the outlet comprises a first outlet through a suction-side surface of the nozzle vane, and a second outlet through a pressure side surface of the nozzle vane.

10. The nozzle vane of claim 8, wherein the plurality of the cavity comprises a forward cavity in a forward portion of the nozzle vane, and an aft cavity in an aft portion of the nozzle vane.

11. The nozzle vane of claim 10, wherein the plurality of the outlet comprises a forward outlet through a suction-side surface of the nozzle vane and in fluid communication with the forward cavity, and an aft outlet through a pressure-side surface of the nozzle vane and in fluid communication with the aft cavity.

12. The nozzle vane of claim 11, further comprising:

a forward channel between the forward cavity and the forward outlet, the forward channel forming a flow path through the forward outlet, wherein the flow path through the forward outlet is substantially perpendicular to the suction-side surface; and an aft channel between the aft cavity and the aft outlet, the aft channel forming a flow path through the aft outlet, wherein the flow path through the aft outlet is substantially perpendicular to the pressure-side surface.

13. The nozzle vane of claim 1, wherein the outlet is through a suction-side surface of the nozzle vane.

14. The nozzle vane of claim 13, wherein the outlet is positioned along the suction-side surface between a point that is 39% of a curve-wise length from a leading edge of the nozzle vane to a trailing edge of the nozzle vane and a point that is 52% of the curve-wise length from the leading edge of the nozzle vane to the trailing edge of the nozzle vane.

15. The nozzle vane of claim 1, wherein the outlet is through a pressure-side surface of the nozzle vane.

16. The nozzle vane of claim 15, wherein the outlet is positioned along the pressure side surface between a point that is 81% of a curve-wise length from a leading edge of the nozzle vane to a trailing edge of the nozzle vane and a point that is 99% of the curve-wise length from the leading edge of the nozzle vane to the trailing edge of the nozzle vane.

17. A nozzle vane comprising:

a forward inlet through a first radial end of the nozzle vane;

a forward cavity within a core of the nozzle vane, the forward cavity extending from the forward inlet towards a second radial end of the nozzle vane and terminating at a forward closed end opposite the forward inlet, the forward cavity being defined by a first tapered surface that extends between the forward inlet and the forward closed end, such that a cross-sectional area of the forward cavity, along a radial axis of the nozzle vane, decreases from the first radial end to the second radial end;

a forward outlet through a suction-side surface of the nozzle vane;

a forward channel connecting the forward cavity to the forward outlet;

an aft inlet through the first radial end of the nozzle vane;

an aft cavity within a core of the nozzle vane, the aft cavity extending from the aft inlet towards the second radial end and terminating at an aft closed end opposite the aft inlet, the aft cavity being defined by a second tapered surface that extends between the aft inlet and the aft closed end, such that a cross-sectional area of the aft cavity, along the radial axis, decreases from the first radial end to the second radial end;

an aft outlet through a pressure-side surface of the nozzle vane; and an aft channel connecting the aft cavity to the aft outlet.

18. The nozzle vane of claim 17, wherein the forward channel forms a flow path through the forward outlet, wherein the flow path through the forward outlet is substantially perpendicular to the suction-side surface, and wherein the aft channel forms a flow path through the aft outlet, wherein the flow path through the aft outlet is substantially perpendicular to the pressure-side surface.

19. The nozzle vane of claim 17, wherein the forward outlet is positioned along the suction-side surface between a point that is 39% of a curve-wise length from a leading edge of the nozzle vane to a trailing edge of the nozzle vane and a point that is 52% of the curve-wise length from the leading edge to the trailing edge, and wherein the aft outlet is positioned along the pressure-side surface between a point that is 81% of a curve-wise length from the leading edge of the nozzle vane to the trailing edge of the nozzle vane and a point that is 99% of the curve-wise length from the leading edge of the nozzle vane to the trailing edge of the nozzle vane.

20. A gas turbine engine comprising:

a compressor;

a combustor downstream from the compressor; and a turbine downstream from the combustor, wherein the turbine includes:

a nozzle comprising a plurality of nozzle vanes arranged annularly around a longitudinal axis of the gas turbine engine, and wherein each of the plurality of nozzle vanes includes an inlet through a first radial end of each of the plurality of nozzle vanes, a cavity within a core of each of the plurality of nozzle vanes, the cavity extending from the inlet towards a second radial end of each of the plurality of nozzle vanes and terminating at a closed end opposite the inlet, the cavity being defined by a tapered surface that extends between the inlet and the closed end, such that a cross-sectional area of the cavity, along a radial axis of each of the plurality of nozzle vanes, decreases from the first radial end to the second radial end, and an outlet through a side surface of each of the plurality of nozzle vanes, the outlet in fluid communication with the cavity.

* * * * *